United States Patent [19]

Gorr et al.

[11] 4,117,485
[45] Sep. 26, 1978

[54] RADAR TARGET CROSS SECTION CONTROL METHOD AND MEANS

[75] Inventors: Benjamin B. Gorr, Ipswich; Richard B. Mack, Winchester, both of Mass.

[73] Assignee: The United States of America as represented by the Secretary of the Air Force, Washington, D.C.

[21] Appl. No.: 105,749

[22] Filed: Jan. 5, 1971

[51] Int. Cl.² .................. G01S 7/38; H01Q 15/00; H01Q 17/00
[52] U.S. Cl. .................. 343/18 E; 343/5 SA; 343/18 A; 343/18 B
[58] Field of Search ............ 343/18 A, 18 B, 18 C, 343/18 D, 18 E, 18 R, 5 SA

[56] References Cited

U.S. PATENT DOCUMENTS

| | | |
|---|---|---|
| 2,931,031 | 3/1960 | DeLoraine et al. ............ 343/5 SA |
| 3,096,494 | 7/1963 | Jacobs et al. ............ 333/81 |
| 3,098,973 | 7/1963 | Wickersham et al. ............ 343/18 B |
| 3,277,476 | 10/1966 | Sabin et al. ............ 343/5 SA |
| 3,305,863 | 2/1967 | Jacobs ............ 343/18 R |
| 3,309,704 | 3/1967 | Klingler ............ 343/18 A |
| 3,325,808 | 6/1967 | Manning ............ 343/18 A |
| 3,568,194 | 3/1971 | Wilson et al. ............ 343/18 E |

*Primary Examiner*—Malcolm F. Hubler
*Attorney, Agent, or Firm*—Joseph E. Rusz; Willard R. Matthews, Jr.

[57] ABSTRACT

Radar target back scattering is controlled by an impedance loading technique. The target is loaded with a variable impedance that is adjusted in response to the frequency of any incident radar signal to achieve optimum reflectivity for that particular frequency. Either radar target cross section reduction or enhancement is achieved over a broad band of frequencies by appropriate control of a voltage variable capacitance diode.

11 Claims, 6 Drawing Figures

INVENTORS
BENJAMIN B. GORR,
RICHARD B. MACK
BY Harry A. Herbert Jr.
William R. Matthews Jr.
ATTORNEYS U.S. Patent  Sept. 26, 1978  Sheet 2 of 2  4,117,485

INVENTORS.
BENJAMIN B. GORR
RICHARD B. MACK
BY Harry G. Herbert Jr.
and
William R. Matthews
ATTORNEYS

RADAR TARGET CROSS SECTION CONTROL METHOD AND MEANS

BACKGROUND OF THE INVENTION

This invention relates to radar targets and more particularly to a novel method and means for controlling the amount of reflected electromagnetic energy that such a target will return.

Radar target cross section reduction has long been used as a tactical device for making the detection of aircraft and missiles difficult for enemy search radar. Such a technique is also useful in discriminating against the non-preferred of two or more closely situated antennas and in diminishing the scattering effect of antenna support structure. Radar target cross section enhancement also has several practical applications. Radar beacons, IFF systems and air traffic control systems are examples.

The electronics industry has consequently been active in developing techniques for accomplishing control of radar target cross sections. The bibliography entitled, *Articles on Radar Reflectivity*, by Corriher and Pyron, published in the *IEEE Proceedings, Vol.* 53N8, August 1965, pages 1025–1065, is an exhaustive review of the state of the art through 1965.

Initial attempts to achieve radar target cross section reduction were directed toward the use of absorbing materials. Such absorbing materials, however, are not very satisfactory since they have little effect when the radar wavelength is larger compared to the target dimensions or the target is observed by a forward scattering radar whose wavelength is small compared with the target dimension. Further, absorbing materials add unwanted weight to missiles and in general cannot withstand reentry temperatures.

The possibilities of controlling radar cross sections of objects by placing the equivalent of properly adjusted small lumped impedances at strategic points in the surface of the object have been investigated and the feasibility of such an approach has been clearly demonstrated. However, with this technique, which is called impedance loading, resulting reduction or enhancement of the scattered energy has been quite narrow-band because the required loading reactances must either be nearly constant or have a negative slope as the frequency is varied, and this type of behavior cannot be obtained with the usual linear, passive, bilateral, lossless elements.

Two basic methods have been used for increasing the bandwidths. The first is a direct synthesis of the required loads using active or nonlinear elements. This approach is difficult because synthesis procedures for these elements are not well established. The alternative method uses a device that senses the incoming frequency and tunes the impedance to a correct value to minimize the scattered energy for that frequency. In effect, this method moves a fairly narrow-band radar cross section control window over a wide range of frequencies. Previous forms of this method have succeeded in obtaining reductions of only two or three db in the scattered energy because of excessive losses in the tuning elements.

The present invention is directed toward overcoming these and other limitations that are prevalent in the state of the art radar target cross section control devices.

SUMMARY OF THE INVENTION

The present invention comprehends a novel method and device by which the electromagnetic fields scattered by an object can be reduced or enhanced over a wide range of frequencies. The control is provided by properly connecting a voltage-variable capacitance diode across an electro-magnetic cavity or a section of transmission line that is terminated itself in a desired impedance, or across an electrically equivalent structure. The assembly is utilized as the loading impedance of an antenna or scattering object or a combination of both which might be, for example, an electrically small slot in the surface of a nose cone or missile. The dynamic relationship of the diode capacitance to applied control voltage then provides the required loading impedance to control the electric fields scattered by the object. The control voltage is derived from a small sample of the incident electromagnetic field through a wide band radio frequency amplifier, limiter, and discriminator, thus making the device self adaptive. That is, it senses the incident frequency and automatically provides the correct loading impedance to control the scattered fields over a wide range of frequencies.

It is a principal object of the invention to provide a new and improved method and means for achieving radar target cross section control.

It is another object of the invention to provide a radar target cross section control device that is lightweight and unaffected by missile reentry temperatures.

It is another object of the invention to provide a new and improved method of increasing the bandwidth of impedance loaded type radar target cross section control devices.

It is another object of the invention to provide an impedance loaded type radar target cross section control device that includes a voltage variable capacitance diode control element.

These, together with other objects, advantages and features of the invention will become more apparent from the following detailed description when taken in conjunction with the illustrated embodiments in the accompanying drawings.

DETAILED DESCRIPTION OF THE PREFERRED EMBODIMENT AND METHOD

Figure 1:
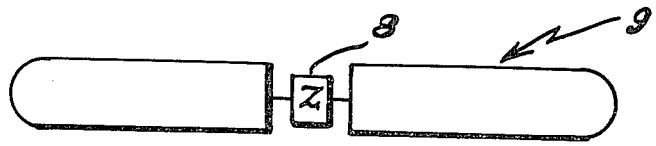
FIG. 1 is a cylindrical radar target having a schematically illustrated impedance load.

An electromagnetic wave incident upon a radar target (any electrically conductive surface) will cause electrical current to flow on its surface. The currents induced on the target by the incident electromagnetic wave produce a scattered electromagnetic field which a radar system receiver can detect and convert into target position and size information. The apparent target as seen by the radar system can therefore be controlled by controlling these induced currents. It has been proposed by K. M. Chen and V. Liepa in their periodical article, *The Minimization of the Back Scattering of a Cylinder by Central Loading*, IEEE Transactions on Antennas and Propagation, Vol. AP-12, pages 576–86, September, 1964, that these currents be controlled by impedance loading. Chen and Liepa have analytically demonstrated that such an approach is valid for cylindrical targets. A target of this type is illustrated by cylinder 9 of FIG. 1. For any given incident wave frequency it is shown that a particular value of impedance 8 will provide either maximum or minimum target reflectivity.

The present invention comprises, in essence, a novel method and means for implementing the impedance loading technique proposed in this periodical article. In particular, the invention comprehends: determining for a given target the impedance values that will provide maximum (or minimum) target cross section over a range of incident wave frequencies; providing the target with a variable impedance that has a negative slope characteristic; detecting the frequency of the incident wave; and varying the variable impedance in response to the detected frequency to provide the desired amount of reflectivity.

Figure 2:
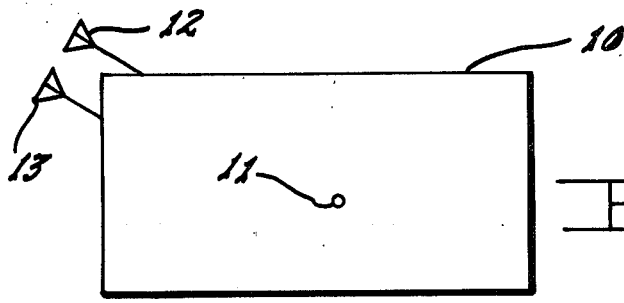
FIG. 2 is a plan view of means for determining reflectivity of a given radar target in accordance with the method of the invention.
Figure 3:
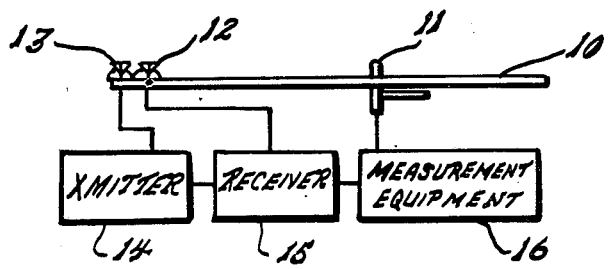
FIG. 3 is an elevation view of the means of FIG. 2 including a block diagram representation of the electronic system associated therewith.

The impedance values can be determined analytically in accordance with the teachings of Chen and Liepa. They can also be determined empirically as hereinafter described with reference to FIGS. 2 and 3.

An image-plane technique can conveniently be used for the radar cross section measurements. This method, although restricting targets to those with a plane of symmetry and the E-field to a polarization perpendicular to the image plane, permits all auxiliary equipment to be placed under the image-plane and hence out of the electromagnetic fields to be measured. By way of example, one specific arrangement used for these measurements comprised an image plane 10 consisting of a 24 × 48 foot rectangle of ⅛inch aluminum plates mounted approximately 10 feet above the ground. Two antennas 13 and 12 were mounted directly on the image plane near one corner to function as separate transmitting and receiving antennas operating from transmitter 14 and receiver 15 respectively and covering UHF frequencies between 200 MHz and 1000 MHz. The scattering model, monopole 11 was mounted near the center of the image plane approximately 25.5 feet from the transmitting and receiving antennas. Thus, the measurements yielded quasi-monostatic results; centers of the transmitting and receiving antennas actually subtended an angle of approximately 5° at the target.

The measuring equipment 16 uses a standard cancellation method with a continuous wave (cw) transmitted signal. A directional coupler transfers a small part of the transmitted power through a variable attenuator and phase shifter to one terminal of a coaxial hybrid. The signal from receiving antenna 12 is fed to the adjoining terminal of the hybrid. A mixer is attached to the difference terminal and a matched load to the remaining terminal. With the scattering model removed, proper adjustment of the amplitude and phase of the auxiliary signal through the directional coupler effectively cancelled background reflections and leakage signals from transmitting antenna 13 with sufficient stability for the cancellation to hold during the time required for a measurement.

Radar cross section measurements at each frequency were made by cancelling the background and leakage signals with no target present, measuring the received power from a reference monopole having the same dimensions as the one being loaded but short-circuited at the groundplane surface, and finally replacing the reference monopole with the loaded one. The load was then adjusted to reduce the received signal to the system noise level. With fixed range, transmitted power, and receiver sensitivity the reduction in received power is directly proportional to a reduction in the radar cross section of the scatterer, $$P_r = c\delta$$

where $P_r$ is the received power, $c$ is a proportionality constant incorporating the fixed system parameters, and $\delta$ is the radar cross section of the target.

Figure 4:
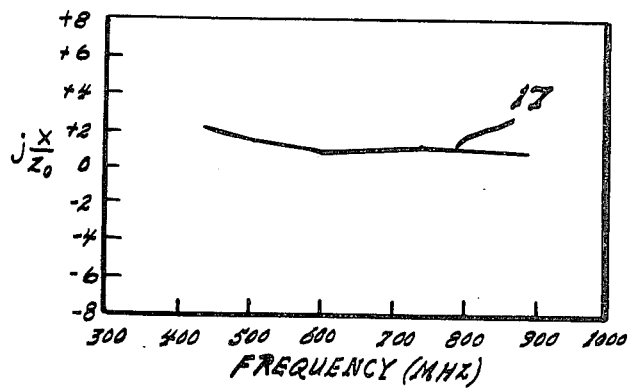
FIG. 4 is a graph illustrating impedance load values over a range of incident electromagnetic wave frequencies as achieved by the device of the invention.

Measurements to determine the proper loading reactances to minimize the backscatter cross sections of monopole 11 were made with a sliding short-circuit within a cavity positioned below image plane 10 at the back of monopole 11. After the background signal was cancelled with monpole 11 removed, monopole 11 was inserted into the image plane and the sliding short adjusted until the received power dropped below the system noise level. The short circuit position was recorded and then converted to an equivalent impedance at the antenna terminals by the usual transmission-line equiation $$X = jZ_o \tan \beta l$$

where $X$ is the reactance at a distance $l$ from the short. Typical results are shown by curve 17 of FIG. 4 where the normalized reactances that produced minimum back-scatter are plotted as a function of frequency. The notable feature of FIG. 4 is the slope of the reactance curve 17 which is predominately negative or nearly constant as frequency increases.

Figure 5:
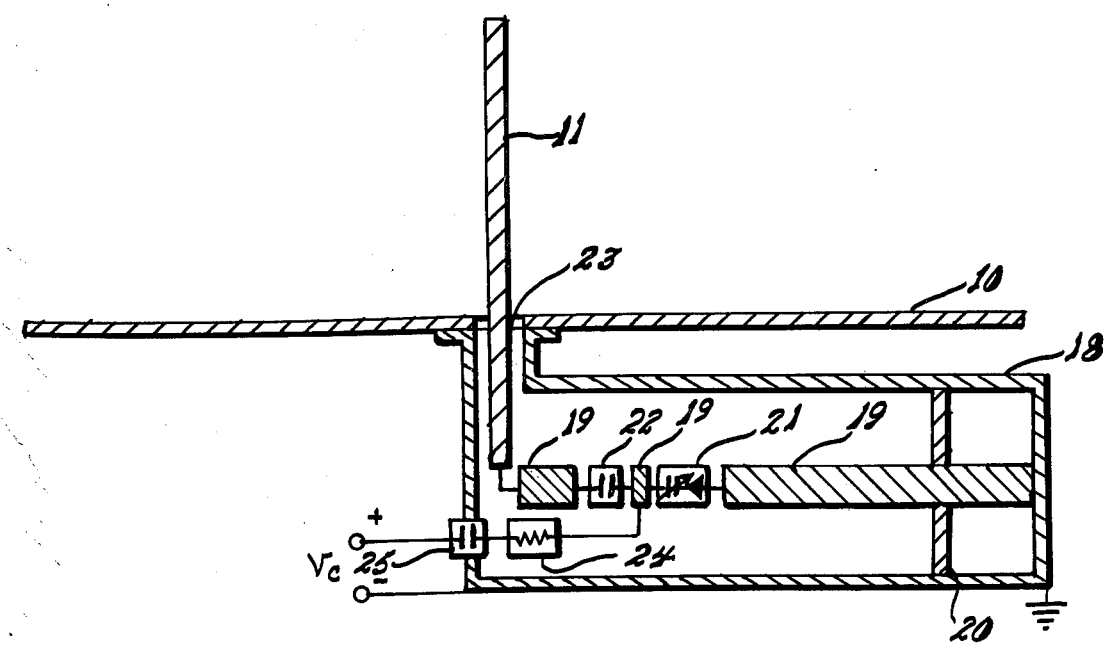
FIG. 5 is a sectional view of the impedance load control device of the invention.

The particular variable impedance means comprehended by the present invention is particularly significant and necessary for an operable device. Referring now to FIG. 5, there is illustrated thereby such a variable impedance. It comprises a coaxial cavity consisting of cylindrical outer member 18, center conductor 19 and movable short 20, voltage variable capacitance diode 21, and blocking condenser 22. The radar target where cross section is to be controlled (in the present example, monopole 11) is connected in series with center conductor 19. Control for the voltage variable capacitance diode 19 is fed through the cavity wall by means of feed-through capacitor 25 and isolation resistor 24. It has been discovered that the electrical characteristics of a variable voltage capacitance diode are unique in that there is provided thereby the required negative slope characteristic of curve 17 in FIG. 4.

Figure 6:
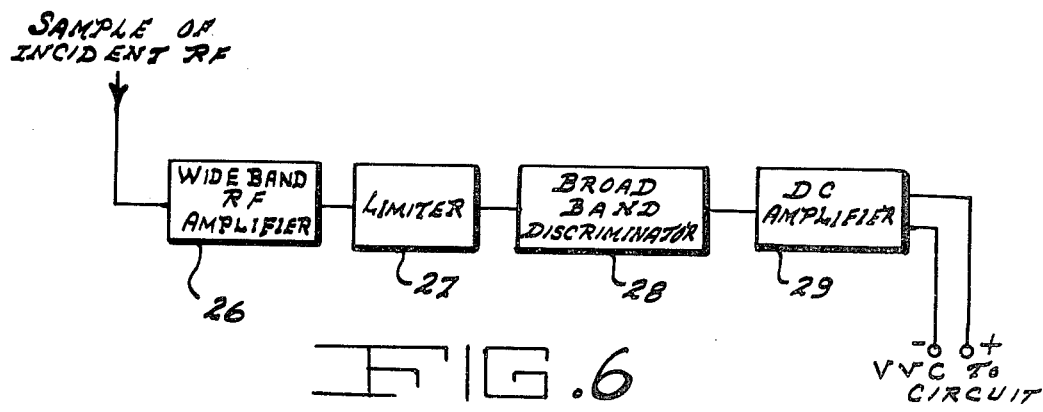
FIG. 6 is a block diagram of the incident electromagnetic wave frequency determining and control signal system.

The frequency of incident electromagnetic waves can be determined by conventional receiving antennas, directional couplers and circuitry of the type illustrated in the block diagram of FIG. 6. That is, a sample of the incident wave can be diverted by a directional coupler to wide band amplifier 26 and thereafter processed by limiter 27, broad band discriminator 28 and DC amplifier 29 to provide a DC signal proportional to the frequency of such incident wave. The DC signal so obtained can be then used to control the voltage variable capacitance diodes to either increase or decrease reflectivity of the target by appropriately varying the load impedance.

Although a particular target and apparatus have been used in describing the invention the technique and general properties of variable voltage capacitance diode loads are not so limited and can be used to enhance the scattered energy as well as to reduce it. Consequently it is to be understood that the foregoing description is made by way of example only and not as a limitation to the scope of the invention as set forth in the objects thereof and in the accompanying claims.

What is claimed is:

1. A radar target having cross section control means, said cross section control means comprising
   means for detecting incident electromagnetic wave energy,
   means for generating therefrom a control signal responsive to the frequency thereof, and
   means for loading said radar target with a variable impedance load, said variable impedance load having electrical characteristics that effect non-increasing capacitive reactance values in response to increasing incident electromagnetic wave frequency,
   said variable impedance load being responsive to and controlled by said control signal.

2. A radar target having cross section control means as defined in claim 1 wherein said variable impedance load has electrical characteristics that effect decreasing capacitive reactance values in response to increasing incident electromagnetic wave frequency.

3. A radar target having cross section control means as defined in claim 1 wherein said variable impedance load comprises a coaxial microwave cavity and a voltage variable capacitor diode, said voltage variable capacitor diode being in series relationship with the center conductor of said coaxial cavity.

4. A radar target having cross section control means as defined in claim 1 wherein said means for detecting incident electromagnetic wave energy comprises a microwave antenna and said means for generating a control signal comprises an RF amplifier adapted to amplifying the output of said microwave antenna, a limiter connected to the output of said amplifier, discriminator means connected to the output of said limiter and a DC amplifier connected to the output of said discriminator means.

5. The method of controlling backscatter from a radar target comprising the steps of 'loading said target with a variable impedance having a voltage variable capacitance diode, and
   adjusting the capacitance diode control voltage to establish an impedance value that achieves optimum selected backscatter at the existing incident radar signal frequency.

6. The method of enhancing backscatter from a radar target comprising the steps of
   loading said target with a variable impedance having a voltage variable capacitance diode, and
   adjusting the capacitance diode control voltage to establish an impedance value that achieves maximum backscatter at the existing incident radar signal frequency.

7. The method of reducing backscatter from a radar target comprising the steps of
   loading said target with a variable impedance having a voltage variable capacitance diode, and
   adjusting the capacitance diode control voltage to establish an impedance value that achieves minimum backscatter at the existing incident radar signal frequency.

8. The method of providing radar target cross section reduction comprising the steps of
   loading a radar target with a variable capacitance impedance, determining the values of said impedance that effect maximum cross section reduction for a range of incident radar signal frequencies, detecting incident radar signals, generating a control signal representative of the detected radar signal frequency, and
   varying said variable impedance therewith to provide the optimum cross section reduction impedance value for the incident radar signal frequency represented thereby.

9. The method of providing radar target cross section reduction defined in claim 8 wherein said variable impedance includes a voltage variable capacitance diode.

10. The method of providing radar target cross section enhancement comprising the steps of
    loading a radar target with a variable capacitance impedance, determining the values of said impedance that effect maximum cross section enhancement for a range of incident radar signal frequencies, detecting incident radar signals, generating a control signal representative of the detected radar signal frequency, and
    varying said variable impedance therewith to provide the optimum cross section enhancement impedance value for the incident radar signal frequency represented thereby.

11. The method of providing radar target enhancement defined in claim 10 wherein said variable impedance includes a voltage variable capacitance diode.

* * * * *